(12) United States Patent
Maeda

(10) Patent No.: US 11,342,785 B2
(45) Date of Patent: May 24, 2022

(54) POWER SUPPLYING SYSTEM, ELECTRONIC APPARATUS, AND POWER SUPPLYING METHOD

(71) Applicant: FUJIFILM Corporation, Tokyo (JP)

(72) Inventor: Fuyuhiko Maeda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

(21) Appl. No.: 17/100,393

(22) Filed: Nov. 20, 2020

(65) Prior Publication Data

US 2021/0075251 A1    Mar. 11, 2021

Related U.S. Application Data

(63) Continuation of application No. 16/419,824, filed on May 22, 2019, now abandoned, which is a (Continued)

(30) Foreign Application Priority Data

Dec. 19, 2016   (JP) .............................. JP2016-245842

(51) Int. Cl.
*H02J 9/06* (2006.01)
*H02J 7/34* (2006.01)
(Continued)

(52) U.S. Cl.
CPC ............... *H02J 9/061* (2013.01); *G06F 1/26* (2013.01); *H02J 1/00* (2013.01); *H02J 7/00* (2013.01); *H02J 7/34* (2013.01); *H02J 9/06* (2013.01)

(58) Field of Classification Search
CPC ...... H02J 9/06; H02J 7/00; H02J 9/061; H02J 7/34; H02J 1/00; G06F 1/26
See application file for complete search history.

(56) References Cited

U.S. PATENT DOCUMENTS

| 6,392,383 B1 | 5/2002 | Takimoto et al. |
| 6,684,340 B1 * | 1/2004 | Lubcke ................. G08C 19/02 702/64 |
| 2005/0280397 A1 | 12/2005 | Iwamoto |

(Continued)

FOREIGN PATENT DOCUMENTS

| DE | 102005027914 A1 | 1/2006 |
| DE | 69934615 T2 | 10/2007 |

(Continued)

OTHER PUBLICATIONS

Japanese Office Action, dated Dec. 11, 2020, for Japanese Application No. 2019-137886, with an English translation.

(Continued)

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

There are provided a power supplying system, an electronic apparatus, and a power supplying method capable of surely preventing an abnormal end even in a case where supply of external power is disconnected in an apparatus having no battery with a valid voltage. The supply system includes a first power feed unit (11) that preferentially outputs external power rather than internal power from a first battery (12) in an electronic apparatus (10), a second power feed unit (21) that preferentially outputs the external power rather than internal power from a second battery (22) in a connection apparatus (20), an external power feed connection unit (external power feed connection path (L3)) that connects an external power feed path (L1) to the first power feed unit (11) and an external power feed path (L2) to the second power feed unit (21), a selection unit (13) that selects one of the first power feed unit (11) and the second power feed unit (21), and a control unit (15) that causes the selection unit (Continued)

(13) to select a power feed unit that receives the internal power between the first power feed unit (11) and the second power feed unit (21).

27 Claims, 11 Drawing Sheets

Related U.S. Application Data continuation of application No. PCT/JP2017/039534, filed on Nov. 1, 2017.

(51) Int. Cl.
*H02J 1/00* (2006.01)
*H02J 7/00* (2006.01)
*G06F 1/26* (2006.01)

(56) References Cited

U.S. PATENT DOCUMENTS

| | | | |
|---|---|---|---|
| 2009/0309419 A1 | 12/2009 | Yamasaki et al. | |
| 2013/0328399 A1 | 12/2013 | Suzuki et al. | |
| 2014/0339912 A1* | 11/2014 | Haseno | H02J 50/12 307/104 |
| 2015/0028800 A1 | 1/2015 | Kim | |
| 2016/0126757 A1* | 5/2016 | Hirosawa | G06F 3/0202 307/20 |

FOREIGN PATENT DOCUMENTS

| | | |
|---|---|---|
| JP | 59-9725 A | 1/1984 |
| JP | 6-311671 A | 11/1994 |
| JP | 9-308129 A | 11/1997 |
| JP | 10-26798 A | 1/1998 |
| JP | 10-91290 A | 4/1998 |
| JP | 2000-89862 A | 3/2000 |
| JP | 2003-29885 A | 1/2003 |
| JP | 2006-99354 A | 4/2006 |
| JP | 2009-301281 A | 12/2009 |
| JP | 2013-254408 A | 12/2013 |
| JP | 2015-27247 A | 2/2015 |

OTHER PUBLICATIONS

German Office Action, dated May 20, 2020, for German Application No. 112017006365.5, with an English translation.
International Preliminary Report on Patentability and Written Opinion of the International Searching Authority dated Jul. 4, 2019, for International Application No. PCT/JP2017/039534, with an English Translation of the Written Opinion.
International Search Report, dated Jan. 16, 2018, for International Application No. PCT/JP2017/039534, with an English translation.
Japanese Office Action, dated Jul. 13, 2020, for Japanese Application No. 2019-137886, with an English translation.

* cited by examiner

FIG. 5

|  | POWER SUPPLY | FIRST CONDITION | SECOND CONDITION |
|---|---|---|---|
| ELECTRONIC APPARATUS | FIRST BATTERY WITH VALID VOLTAGE | NO | YES |
| ELECTRONIC APPARATUS | EXTERNAL POWER SUPPLY | YES (OR NO) | NO (OR YES) |
| CONNECTION APPARATUS | SECOND BATTERY WITH VALID VOLTAGE | YES | NO |
| CONNECTION APPARATUS | EXTERNAL POWER SUPPLY | NO (OR YES) | YES (OR NO) |
| SELECTION INSTRUCTION | | SECOND POWER FEED UNIT | FIRST POWER FEED UNIT |

POWER SUPPLYING SYSTEM, ELECTRONIC APPARATUS, AND POWER SUPPLYING METHOD

CROSS-REFERENCE TO RELATED APPLICATIONS

This application is a Continuation of copending application Ser. No. 16/419,824, filed on May 22, 2019, which is a Continuation of International Application No. PCT/JP2017/039534, filed on Nov. 1, 2017, which claims the benefit under 35 U.S.C. § 119(a) to Patent Application No. 2016-245842, filed in Japan on Dec. 19, 2016, all of which are hereby expressly incorporated by reference into the present application.

BACKGROUND OF THE INVENTION

1. Field of the Invention

The present invention relates to a power supplying system, an electronic apparatus, and a power supplying method.

2. Description of the Related Art

In the related art, there is a known technique of giving priority to power from an external alternating current (AC) adapter of an electronic apparatus rather than power from an internal battery of the electronic apparatus (refer to JP1994-311671A (JP-H6-311671A) and JP1997-308129A (JP-H9-308129A)).

JP2003-029885A discloses that two electronic apparatuses are connected by a cable having a data communication line and a power supply supplying line, and a power supply situation of the other electronic apparatus is determined by communication with the other electronic apparatus through the data communication line and a power supply situation of own electronic apparatus is also determined to supply the power from the AC adapter from one electronic apparatus to the other electronic apparatus through the power supply supplying line in a case where the AC adapter is connected to only one electronic apparatus.

SUMMARY OF THE INVENTION

In the configuration in which the two apparatuses are connected so as to supply the power between the apparatuses, a power feed voltage Vin from the AC adapter instantaneously drops less than an allowable voltage (for example, termination voltage VF of battery) as shown in FIG. 12 in a case where the cable of the AC adapter is removed from one apparatus having no battery with a valid voltage. Therefore, there is a problem that one apparatus may be abnormally ended even in a case where a battery in the other apparatus has a valid voltage. In FIG. 12, a horizontal axis is time t, a vertical axis is the power feed voltage Vin from the AC adapter, a voltage VE is a voltage of the AC adapter, time tE is when the cable is removed, and time tF is a time at which the voltage Vin drops to the termination voltage VF of the battery.

There are no descriptions relating to the power supplying between the two apparatuses in JP1994-311671A (JP-H6-311671A) and JP1997-308129A (JP-H9-308129A).

In a case where a cable of the AC adapter is removed from one electronic apparatus having no battery with the valid voltage, the power supplying from the AC adapter is instantaneously disconnected even using the technique disclosed in JP2003-029885A. Therefore, in a case where switching of the power supplying to the power of a battery in the other electronic apparatus is delayed, the abnormal end may occur.

The invention is made in consideration of such circumstances, and a purpose of the invention is to provide a power supplying system, an electronic apparatus, and a power supplying method capable of surely preventing the abnormal end even in the case where the supply of the external power is disconnected in the apparatus having no battery with the valid voltage.

In order to achieve the purpose described above, a power supplying system according to a first aspect of the invention includes an electronic apparatus and a connection apparatus connectable to the electronic apparatus, and comprises a first power feed unit that is provided in the electronic apparatus, is capable of receiving internal power from a first battery in the electronic apparatus and of receiving external power, and preferentially outputs the external power rather than the internal power from the first battery, a second power feed unit that is provided in the connection apparatus, is capable of receiving internal power from a second battery in the connection apparatus and of receiving the external power, and preferentially outputs the external power rather than the internal power from the second battery, an external power feed connection unit that connects a power feed path of the external power to the first power feed unit and a power feed path of the external power to the second power feed unit, a selection unit that selects one of the first power feed unit and the second power feed unit as a supplying source of use power of the electronic apparatus, and a control unit that causes the selection unit to select a power feed unit that receives the internal power between the first power feed unit and the second power feed unit.

According to this aspect, in a case where there is a battery with a valid voltage in the other apparatus even though there is no battery with the valid voltage in one apparatus that receives the external power between the electronic apparatus and the connection apparatus, the external power is transmitted from one apparatus to the power feed unit of the other apparatus through the external power feed connection unit and the power feed unit of the other apparatus is selected by the selection unit. Therefore, even in a case where the external power for one apparatus is disconnected, the disconnected external power is instantaneously switched to the internal power of the other apparatus. That is, it is possible to surely prevent the abnormal end even in the case where the supplying of the external power is disconnected in the apparatus having no battery with the valid voltage.

In the power supplying system according to a second aspect of the invention, the first power feed unit preferentially outputs power with a higher voltage between the internal power from the first battery and the external power to the selection unit, and the second power feed unit preferentially outputs power with a higher voltage between the internal power from the second battery and the external power to the selection unit.

In the power supplying system according to a third aspect of the invention, the control unit has a determination unit that determines presence or absence of the first battery and the second battery with a valid voltage and provides an instruction of the selection to the selection unit based on a result of the determination by the determination unit.

In the power supplying system according to a fourth aspect of the invention, the control unit causes the selection unit to select a power feed unit set in advance between the first power feed unit and the second power feed unit in a state where both the first battery and the second battery have the valid voltage.

In the power supplying system according to a fifth aspect of the invention, the control unit causes the selection unit to select a power feed unit connected to the battery with the valid voltage between the first power feed unit and the second power feed unit in a state where one of the first battery and the second battery has the valid voltage.

In the power supplying system according to a sixth aspect of the invention, the electronic apparatus and the connection apparatus are respectively provided with an external power input terminal capable of receiving the external power from an external power supply, the first power feed unit is connected to the external power input terminal provided in the electronic apparatus, and the second power feed unit is connected to the external power input terminal provided in the connection apparatus.

In the power supplying system according to a seventh aspect of the invention, one of the electronic apparatus and the connection apparatus is provided with an external power input terminal capable of receiving the external power from an external power supply, and one of the first power feed unit and the second power feed unit is connected to the external power input terminal through the external power feed connection unit and the other power feed unit is connected to the external power input terminal, not through the external power feed connection unit.

The power supplying system according to an eighth aspect of the invention further comprises a reverse current prevention circuit that prevents a current from flowing from one external power supply to the other external power supply of the external power supply connected to the external power input terminal of the electronic apparatus and the external power supply connected to the external power input terminal of the connection apparatus.

The power supplying system according to a ninth aspect of the invention further comprises a power supply OR circuit that receives the output of the first power feed unit and the output of the second power feed unit, and supplies the power to the control unit.

An electronic apparatus according to a tenth aspect of the invention is an electronic apparatus to which a connection apparatus is connectable, and comprises a first power feed unit that is capable of receiving internal power from a first battery in the electronic apparatus and of receiving external power, and preferentially outputs the external power rather than the internal power from the first battery, a connection apparatus power input terminal connected to a second power feed unit that is provided in the connection apparatus, is capable of receiving internal power from a second battery in the connection apparatus and of receiving the external power, and preferentially outputs the external power rather than the internal power from the second battery, an external power feed connection unit that connects a power feed path of the external power to the first power feed unit and a power feed path of the external power to the second power feed unit, a selection unit that selects one of the first power feed unit and the second power feed unit as a supplying source of use power of the electronic apparatus, and a control unit that causes the selection unit to select a power feed unit that receives the internal power between the first power feed unit and the second power feed unit.

A power supplying method according to an eleventh aspect of the invention is a power supplying method that supplies power to an electronic apparatus using a first power feed unit that is provided in the electronic apparatus, is capable of receiving internal power from a first battery in the electronic apparatus and of receiving external power, and preferentially outputs the external power rather than the internal power from the first battery, and a second power feed unit that is provided in a connection apparatus connectable to the electronic apparatus, is capable of receiving internal power from a second battery in the connection apparatus and of receiving the external power, and preferentially outputs the external power rather than the internal power from the second battery, and comprises connecting a power feed path of the external power to the first power feed unit and a power feed path of the external power to the second power feed unit, and selecting a power feed unit that receives the internal power between the first power feed unit and the second power feed unit as a supplying source of use power of the electronic apparatus.

According to the invention, it is possible to surely prevent the abnormal end even in the case where the supply of the external power is disconnected in the apparatus having no battery with the valid voltage.

BRIEF DESCRIPTION OF THE DRAWINGS

FIG. 5 is an explanatory diagram used to describe an instruction from a control unit to a selection unit.

DESCRIPTION OF THE PREFERRED EMBODIMENTS

Hereinafter, forms for implementing a power supplying system, an electronic apparatus, and a power supplying method according to the invention will be described with reference to accompanying drawings.

Figure 1:
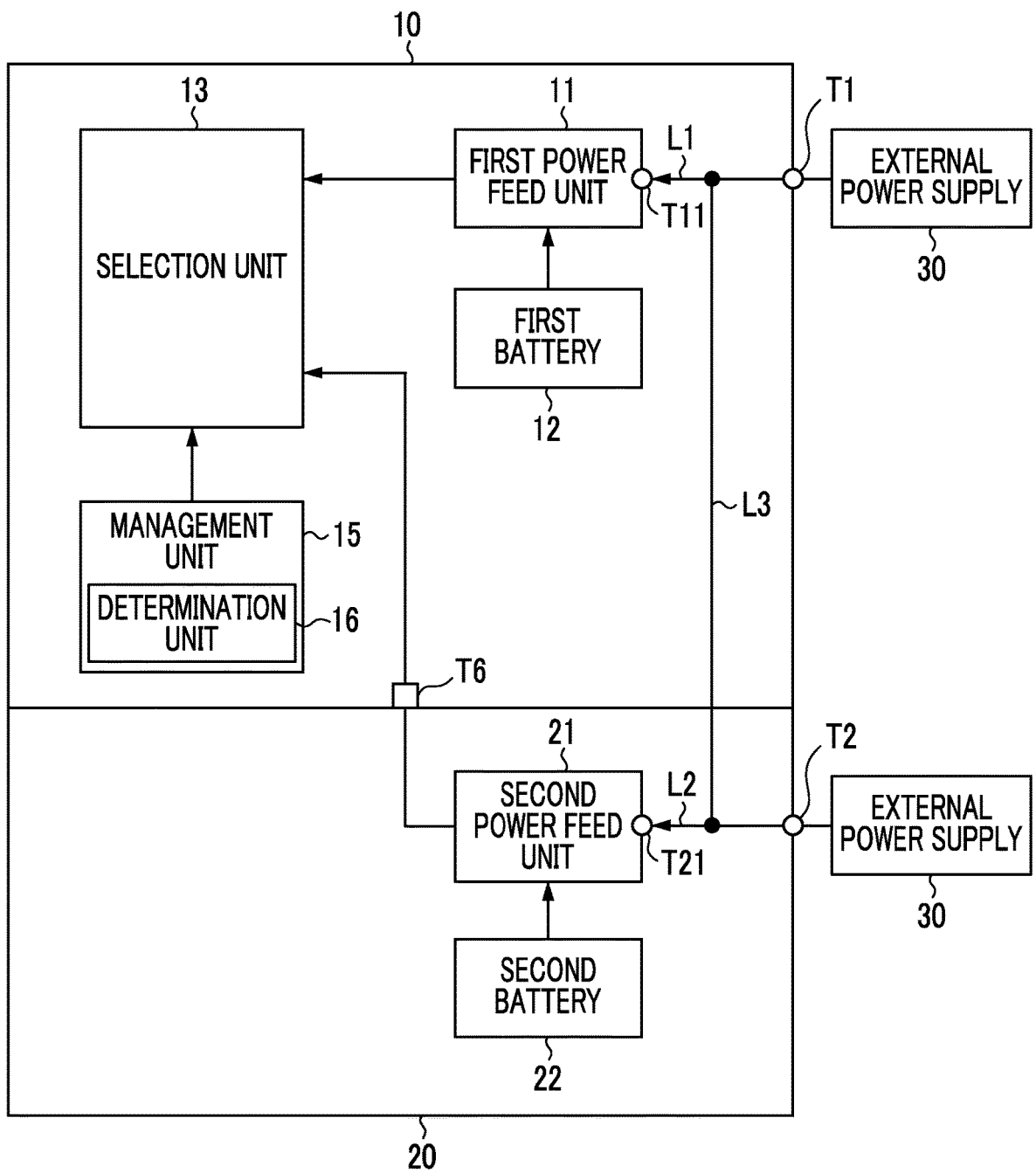
FIG. 1 is a block diagram showing a basic configuration example of a power supplying system according to the invention.

FIG. 1 is a block diagram showing a basic configuration example of a power supplying system according to the invention.

The power supplying system of this example is configured by including an electronic apparatus 10 and a connection apparatus 20 which is an apparatus connectable to the electronic apparatus 10.

The electronic apparatus 10 is provided with a first power feed unit 11, and the connection apparatus 20 is provided with a second power feed unit 21. Further, the electronic apparatus 10 is provided with a connection apparatus power input terminal T6 which is a terminal to which power from the connection apparatus 20 is input.

The first power feed unit 11 provided in the electronic apparatus 10 can receive power (hereinafter referred to as "first internal power") from a first battery 12 in the electronic apparatus 10 and receive power (hereinafter referred to as "external power") from an external power supply 30 corresponding to a voltage higher than a valid voltage of the first battery 12, and preferentially outputs the external power from the external power supply 30 rather than the first internal power from the first battery 12.

The second power feed unit 21 provided in the connection apparatus 20 can receive power (hereinafter referred to as "second internal power") from a second battery 22 in the connection apparatus 20 and receive the external power from an external power supply 30 corresponding to the voltage higher than a valid voltage of the second battery 22, and preferentially outputs the external power from the external power supply 30 rather than the second internal power from the second battery 22.

In this specification, "can receive" the power refers to be connected to the power supply (first battery, second battery, or external power supply) wiredly or wirelessly. In a case of wireless connection, the power is supplied by power transmission using a magnetic field or an electric field.

The electronic apparatus 10 of this example is wiredly connected to the external power supply 30 through a first external power input terminal T1. The connection apparatus 20 of this example is wiredly connected to the external power supply 30 through a second external power input terminal T2.

An external power feed connection path L3 (one form of "external power feed connection unit") electrically connects a power feed path (first external power feed path L1) of the external power from the first external power input terminal T1 of the electronic apparatus 10 to the first power feed unit 11 and a power feed path (the second external power feed path L2) of the external power from the second external power input terminal T2 of the connection apparatus 20 to the second power feed unit 21. In other words, it can be said that the external power feed connection path L3 electrically connects the terminal (external power input terminal T11 of first power feed unit 11) for external power input provided in the first power feed unit 11 and the terminal (external power input terminal T21 of second power feed unit 21) for external power input provided in the second power feed unit 21. The invention is not limited to the case where the first external power feed path L1 and the second external power feed path L2 are electrically connected. The first external power feed path L1 and the second external power feed path L2 may be magnetically connected.

The electronic apparatus 10 of this example is configured by including the first power feed unit 11 described above, the first battery 12 described above, a selection unit 13 that selects one of the first power feed unit 11 and the second power feed unit 21 as a supplying source of use power of the electronic apparatus 10, and a control unit 15 that causes the selection unit 13 to select a power feed unit that receives the internal power between the first power feed unit 11 and the second power feed unit 21.

The control unit 15 is configured of, for example, a microcomputer. The control unit 15 of this example has a determination unit 16 that determines the presence or absence of the first battery 12 with the valid voltage and determines the presence or absence of the second battery 22 with the valid voltage, and provides a selection instruction to the selection unit 13 to select the supplying source of the use power of the electronic apparatus 10 between the first power feed unit 11 and the second power feed unit 21 based on a result of the determination by the determination unit 16.

Figure 2:
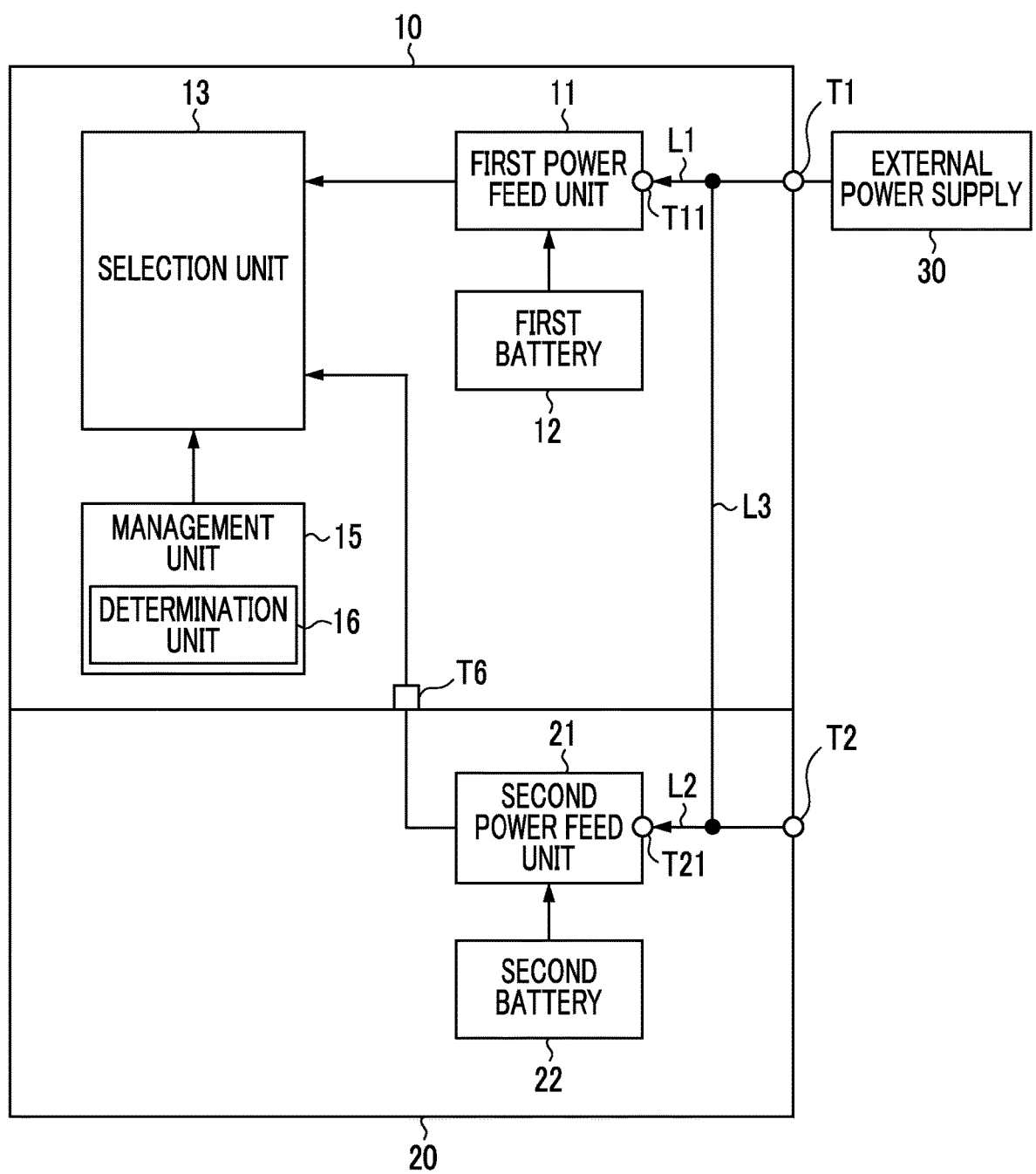
FIG. 2 is a block diagram showing a state where an external power supply is connected only to an electronic apparatus.
Figure 3:
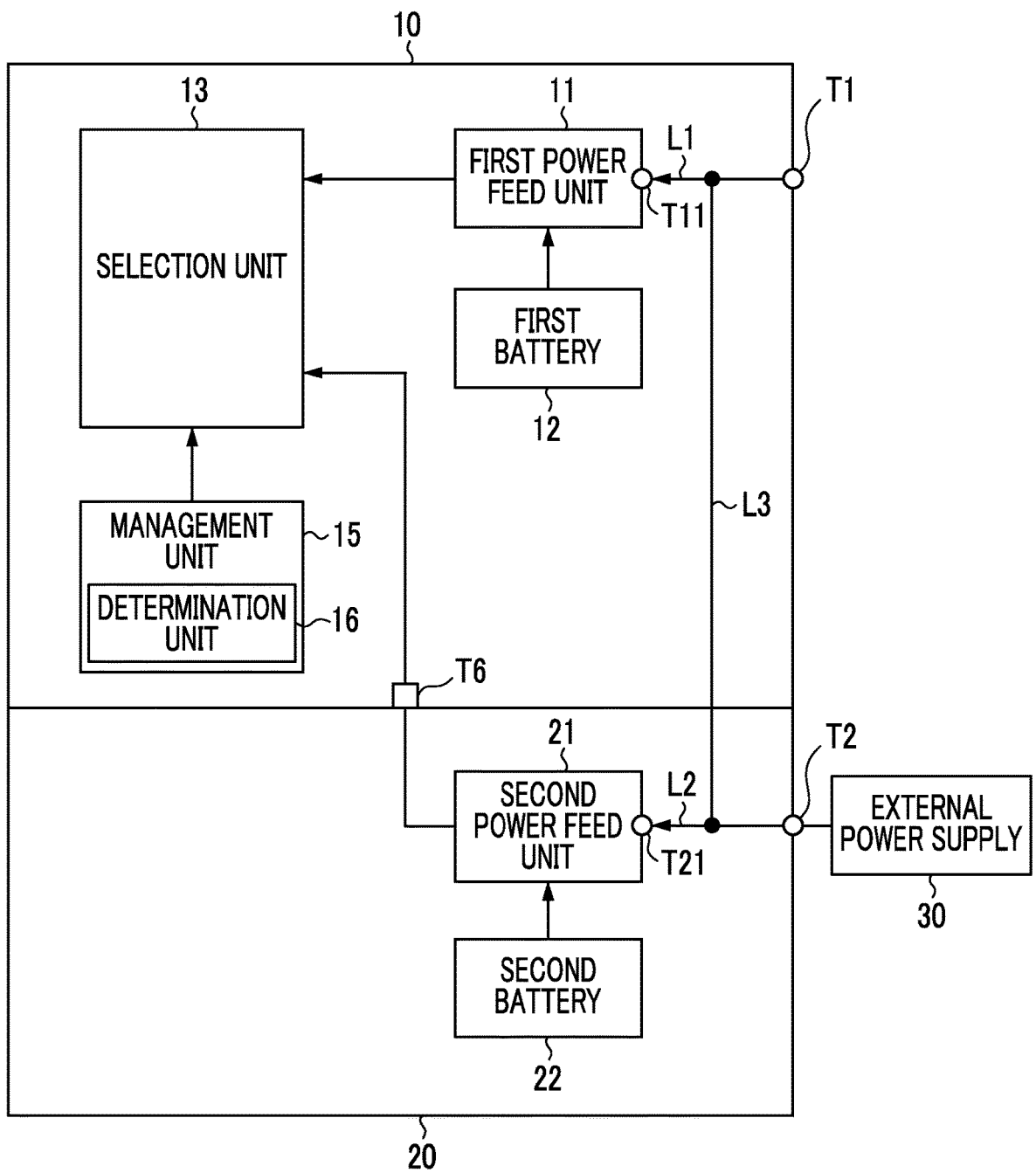
FIG. 3 is a block diagram showing a state where the external power supply is connected only to a connection apparatus.
Figure 4:
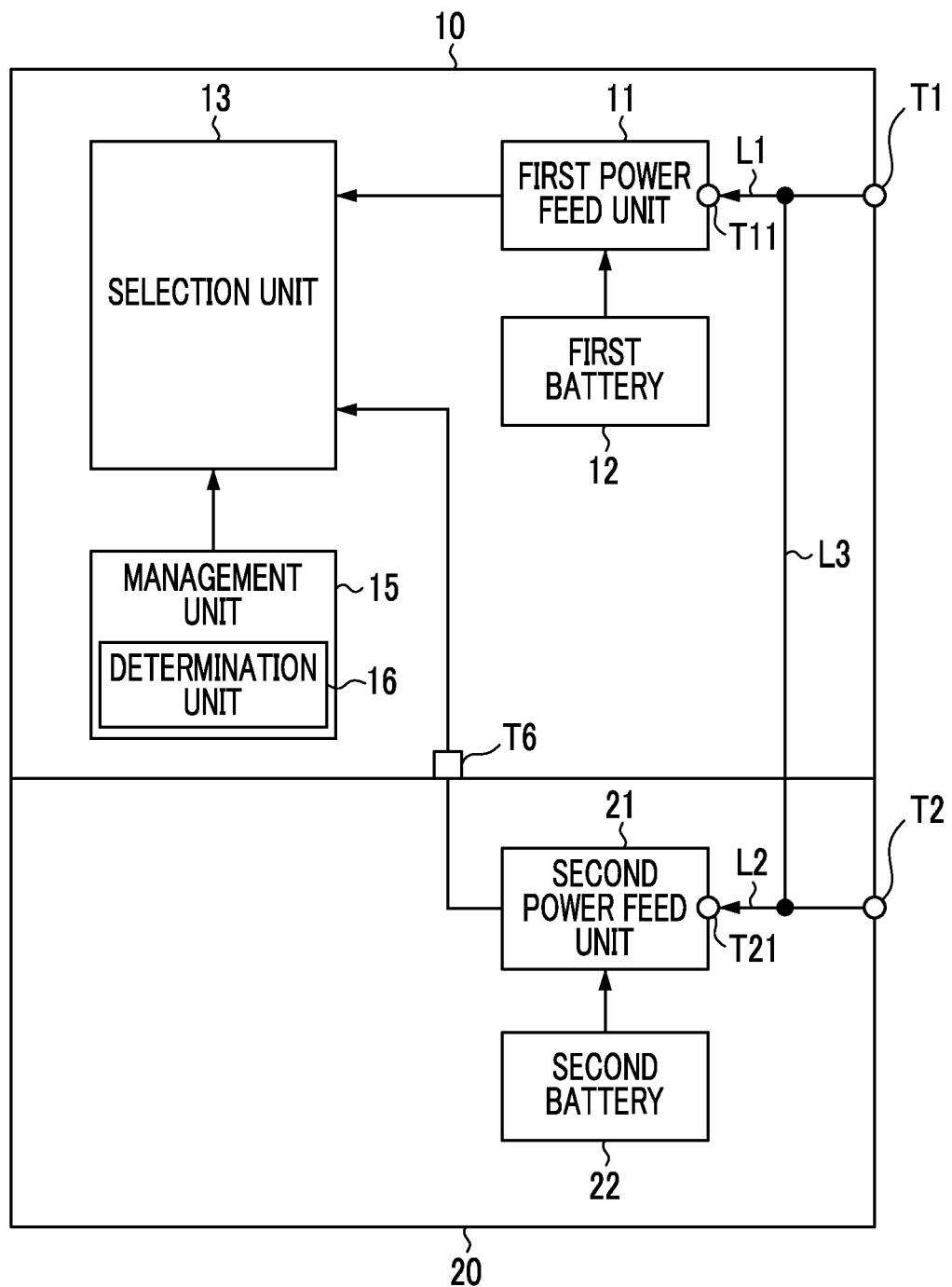
FIG. 4 is a block diagram showing a state where the external power supply is not connected to both the electronic apparatus and the connection apparatus.

FIG. 1 shows the case where the external power supply 30 is connected to both the first power feed unit 11 and the second power feed unit 21. However, there is actually a case where the external power supply 30 is connected to one of the first power feed unit 11 and the second power feed unit 21 as shown in FIGS. 2 and 3 or a case where the external power supply 30 is not connected to both the first power feed unit 11 and the second power feed unit 21 as shown in FIG. 4. In the states shown in FIGS. 2 and 3 among these cases, the external power is transmitted from one of the electronic apparatus 10 and the connection apparatus 20 to the other power feed unit through the external power feed connection path L3.

The control unit 15 of this example provides the selection instruction to the selection unit 13 as shown in FIG. 5. The control unit 15 of this example causes the selection unit 13 to select the second power feed unit 21 in a first condition (condition where there is no first battery 12 with the valid voltage in the electronic apparatus 10, there is the second battery 22 with the valid voltage in the connection apparatus 20, and there is the external power supply 30 connected to at least one of the electronic apparatus 10 or the connection apparatus 20). Further, the control unit 15 of this example causes the selection unit 13 to select the first power feed unit 11 in a second condition (condition where there is the first battery 12 with the valid voltage in the electronic apparatus 10, there is no second battery 22 with the valid voltage in the connection apparatus 20, and there is the external power supply 30 connected to at least one of the electronic apparatus 10 or the connection apparatus 20). That is, the control unit 15 causes the selection unit 13 to select a power feed unit connected to the battery with the valid voltage (that is, power feed unit that receives internal power) between the first power feed unit 11 and the second power feed unit 21.

In a case where there is a condition not corresponding to the first condition and the second condition described above, the control unit 15 may provide the selection instruction to the selection unit 13 as follows.

The control unit 15 may cause the selection unit 13 to select a power feed unit set in advance of the first power feed unit 11 and the second power feed unit 21 in a state where both the first battery 12 and the second battery 22 have the valid voltage. For example, it is possible to use the power of the first battery 12 and the second battery 22 in an order of set in advance by a program. The power of the first battery 12 and the second battery 22 may be used in an order in which a setting is input by a user.

It can also be said that the electronic apparatus 10 shown in FIG. 1 is the following configuration. The electronic apparatus 10 of this example is an electronic apparatus to which the connection apparatus 20 is connectable, and comprises the first power feed unit 11 that can receive the internal power from the first battery 12 in the electronic apparatus 10 and receive the external power from the external power supply 30, and preferentially outputs the external power rather than the internal power from the first battery 12, the connection apparatus power input terminal T6 connected to the second power feed unit 21 that is provided in the connection apparatus 20, can receive the internal power from the second battery 22 in the connection apparatus 20 and can receive the external power from the external power supply 30, and preferentially outputs the external power rather than the internal power from the second battery 22, the external power feed connection path L3 that connects the power feed path (first external power feed path L1) of the external power to the first power feed unit 11 and the power feed path (second external power feed path L2) of the external power to the second power feed unit 21, the selection unit 13 that selects one of the first power feed unit 11 and the second power feed unit 21 as the supplying source of the use power of the electronic apparatus 10, and the control unit 15 that causes the selection unit 13 to select a power feed unit that receives the internal power between the first power feed unit 11 and the second power feed unit 21.

Next, a specific example of the power supplying system shown in FIG. 1 will be described.

Figure 6:
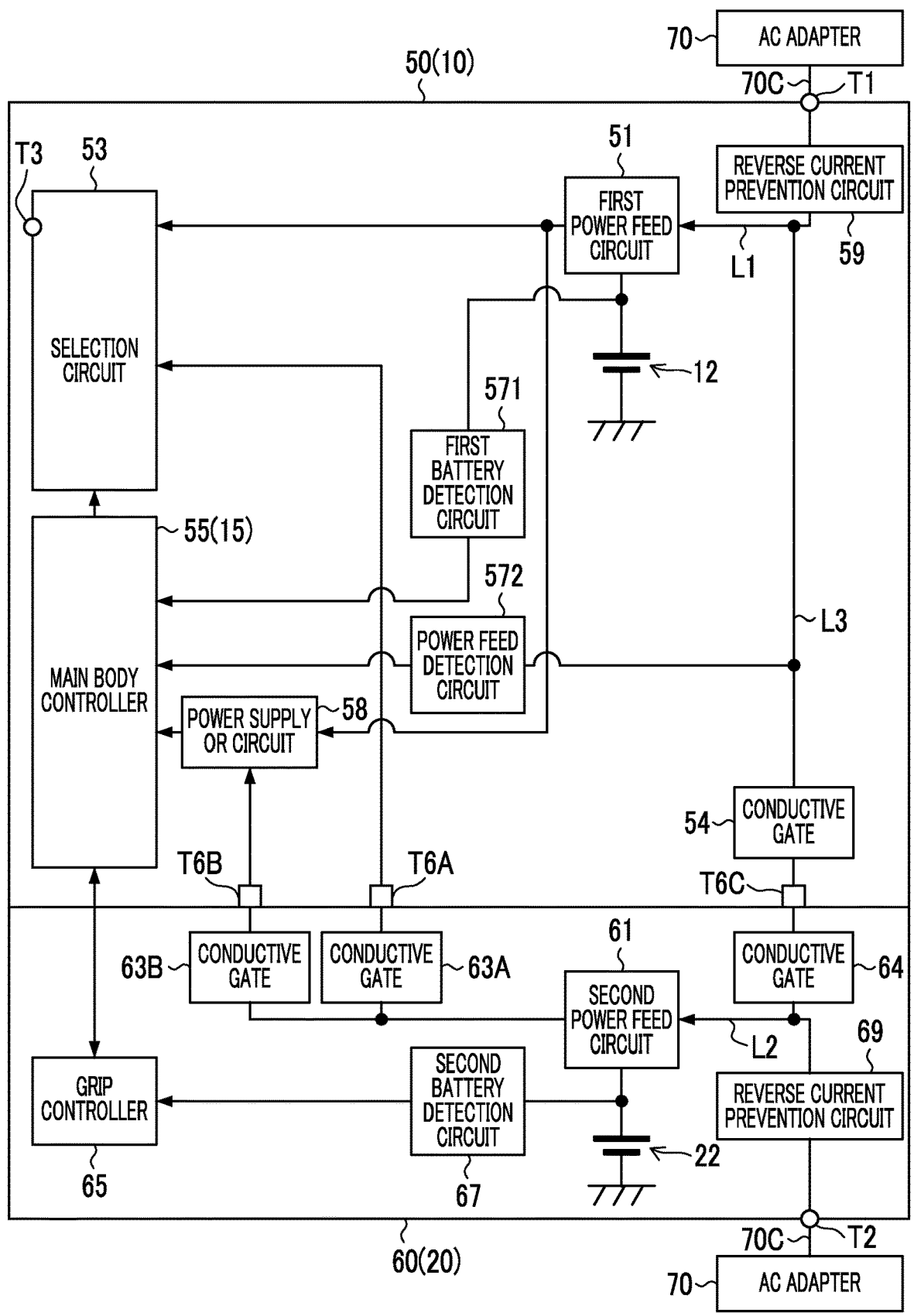
FIG. 6 is a block diagram showing main parts of one example of an electronic apparatus system in which the power supplying system shown in FIG. 1 is employed.

FIG. 6 is a block diagram showing main parts of one example of an electronic apparatus system in which the power supplying system shown in FIG. 1 is employed. The electronic apparatus system of this example is configured by including a digital camera 50 (one form of "electronic apparatus") and a grip 60 (one form of "connection apparatus") attachable to the digital camera 50. The grip 60 is one type of a functional unit having a specific function with the digital camera 50 as a main body. The "attachment" to the digital camera 50 is one form of "connection".

The digital camera 50 is provided with the first external power input terminal T1 to which the external power from an AC adapter 70 (one form of "external power supply") is input. A first power feed circuit 51 (one form of "first power feed unit") provided in the digital camera 50 is electrically connected to the first external power input terminal T1. The first power feed circuit 51 of this example can be electrically connected to the AC adapter 70 through a cable 70C, the first external power input terminal T1, a reverse current prevention circuit 59 described below, and the first external power feed path L1.

The grip 60 is provided with the second external power input terminal T2 to which the external power from the AC adapter 70 is input. A second power feed circuit 61 (one form of second power feed unit") provided in the grip 60 is electrically connected to the second external power input terminal T2. The second power feed circuit 61 of this example is electrically connected to the AC adapter 70 through the cable 70C, the second external power input terminal T2, a reverse current prevention circuit 69 described below, and the second external power feed path L2.

FIG. 6 shows the case where the AC adapter 70 is connected to both the first power feed circuit 51 and the second power feed circuit 61. However, there is actually a case where the AC adapter 70 is connected to only one of the first power feed circuit 51 and the second power feed circuit 61 or a case where the AC adapter 70 is not connected to both the first power feed circuit 51 and the second power feed circuit 61.

In the case where the AC adapter 70 is connected to only one of the first power feed circuit 51 and the second power feed circuit 61, the power from the AC adapter 70 (external power) is supplied from the power feed path connected to one power feed circuit to the other power feed circuit through the external power feed connection path L3. In this example, the external power is supplied through a conductive gate 54 and an external power feed connection terminal T6C provided in the digital camera 50 and a conductive gate 64 provided in the grip 60.

The first power feed circuit 51 provided in the digital camera 50 is electrically connected to the first battery 12 in the digital camera 50. The first power feed circuit 51 preferentially outputs power with a higher voltage between the internal power from the first battery 12 and the external power from the AC adapter 70. The second power feed circuit 61 provided in the grip 60 is electrically connected to the second battery 22 in the grip 60. The second power feed circuit 61 preferentially outputs power with a higher voltage between the internal power from the second battery 22 and the external power from the AC adapter 70. That is, the first power feed circuit 51 and a second power feed circuit 52 (first power feed unit 11 and second power feed unit 21) of this example respectively output the power with the higher voltage between internal power supply (battery in this example) and the external power supply (AC adapter in this example). Known circuits may be used as the first power feed circuit 51 and the second power feed circuit 61. A charge power feed circuit that can charge the first battery 12 with the external power from the AC adapter 70 is used as the first power feed circuit 51 of this example. A charge power feed circuit that can charge the second battery 22 with the external power from the AC adapter 70 is used as the second power feed circuit 61 of this example.

A selection circuit 53 (one form of "selection unit") provided in the digital camera 50 selects one of the first power feed circuit 51 and the second power feed circuit 61 as the supplying source of the use power of the digital camera 50. In this example, an output of the second power feed circuit 61 is supplied to the selection circuit 53 through a first conductive gate 63A and a first connection apparatus power input terminal T6A.

A main body controller 55 (one form of "control unit") provided in the digital camera 50 causes the selection circuit 53 to select a power feed circuit that receives the internal power (power from first battery 12 or power from second battery 22) between the first power feed circuit 51 and the second power feed circuit 61. The main body controller 55 is configured of, for example, a central processing unit (CPU).

The main body controller 55 of this example acquires detection results of a first battery detection circuit 571 and a power feed detection circuit 572 provided in the digital camera 50, and a detection result of a second battery detection circuit 67 provided in the grip 60. The main body controller 55 of this example performs the selection instruction to the selection circuit 53 based on the acquired detection result.

The first battery detection circuit 571 provided in the digital camera 50 performs an analog to digital (AD) conversion to detect the voltage of the first battery 12 in the digital camera 50. The second battery detection circuit 67 provided in the grip 60 performs the AD conversion to detect the voltage of the second battery 22 in the grip 60. In this example, the detection result of the second battery detection circuit 67 is provided to the main body controller 55 through a grip controller 65. The grip controller 65 transmits the detection result to the main body controller 55 by, for example, serial communication. The grip controller 65 is configured of, for example, the central processing unit (CPU).

The power feed detection circuit 572 provided in the digital camera 50 performs the AD conversion to detect a voltage of the external power feed connection path L3.

The main body controller 55 (control unit) of this example causes the selection circuit 53 (selection unit) to select a power feed circuit set in advance between the first power feed circuit 51 (first power feed unit 11) and the second power feed circuit 61 (second power feed unit 21) in a state where both the first battery 12 and the second battery 22 have the valid voltage.

The main body controller 55 (control unit) of this example causes the selection circuit 53 to select a power feed circuit connected to a battery with the valid voltage between the first power feed circuit 51 (first power feed unit 11) and the second power feed circuit 61 (second power feed unit 21) in a state where one of the first battery 12 and the second battery 22 has the valid voltage.

In this example, the valid voltage of the first battery 12 is equal to the valid voltage of the second battery 22. However, the invention can be employed also in a case where the valid voltage of the first battery 12 differs from the valid voltage of the second battery 22. The voltage of the AC adapter 70 is higher than the valid voltage of the first battery 12 and the valid voltage of the second battery 22.

The first battery 12 and the second battery 22 of this example are rechargeable batteries (also referred to as "secondary battery"), and "there is no battery with the valid battery voltage" means that a voltage of the rechargeable battery is less than an allowable voltage (valid battery voltage) in a case of being used in the apparatus.

The digital camera 50 of this example is provided with a power supply OR circuit 58 that receives the output of the first power feed circuit 51 and the output of the second power feed circuit 61, performs OR of the output of the first power feed circuit 51 and the output of the second power feed circuit 61, and supplies the power to the main body controller 55. In this example, the output of the second power feed circuit 61 is supplied to the power supply OR circuit 58 through a second conductive gate 63B and a second connection apparatus power input terminal T6B.

The reverse current prevention circuits 59 and 69 are respectively provided in the first external power feed path L1 from the first external power input terminal T1 to the first power feed circuit 51 of the digital camera 50 and the second external power feed path L2 from the second external power input terminal T2 to the second power feed circuit 61 of the grip 60. The reverse current prevention circuit 59 provided in the digital camera 50 prevents a current from flowing from the AC adapter 70 connected to the external power input terminal T1 of the digital camera 50 to the AC adapter 70 connected to the external power input terminal T2 of the grip 60. The reverse current prevention circuit 69 provided in the grip 60 prevents a current from flowing from the AC adapter 70 connected to the external power input terminal T2 of the grip 60 to the AC adapter 70 connected to the external power input terminal T1 of the digital camera 50.

Figure 7:
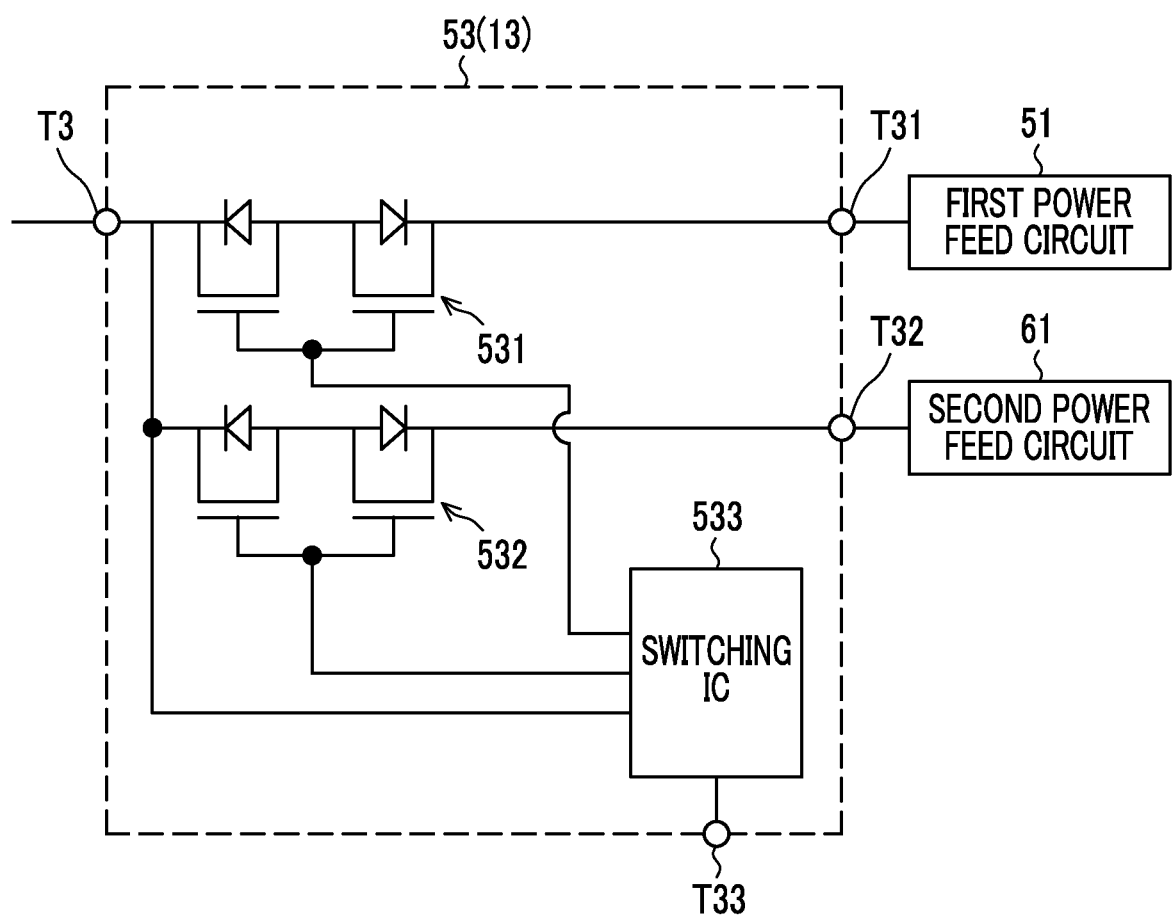
FIG. 7 is a diagram showing an example of a selection circuit shown in FIG. 6.

FIG. 7 is a diagram showing an example of the selection circuit 53 shown in FIG. 6.

The selection circuit 53 of this example is configured by including a first selection power input terminal T31 to which the output of the first power feed circuit 51 is input, a second selection power input terminal T32 to which the output of the second power feed circuit 61 is input, an instruction input terminal T33 to which an instruction from a main body controller 55 is input, a selection power output terminal T3 that outputs the power from the selected power feed circuit between the first power feed circuit 51 and the second power feed circuit 61, a first switch element 531 that switches whether to select the output of the first power feed circuit 51 which is input to the first selection power input terminal T31, a second switch element 532 that switches whether to select the output of the second power feed circuit 61 which is input to the second selection power input terminal T32, and a switching integrated circuit (IC) 533 that outputs a switching instruction to the first switch element 531 and the second switch element 532 based on the instruction (selection instruction) to be input from the main body controller 55 to instruction input terminal T33.

In the main body controller 55 of this example, an instruction to cause the selection circuit 53 to select the second power feed circuit 61 of the grip 60 is input to the instruction input terminal T33 of the selection circuit 53 in the first condition shown in FIG. 5. Further, in the main body controller 55 of this example, an instruction to cause the selection circuit 53 to select the first power feed circuit 51 of the digital camera 50 is input to the instruction input terminal T33 of the selection circuit 53 in the second condition shown in FIG. 5. In the case where the selection instruction is input from the main body controller 55 to the instruction input terminal T33, a switching IC 533 of the selection circuit 53 switches the supplying source of the use power of the digital camera 50 (electronic apparatus) to the switch elements 531 and 532 of the selection circuit 53 in response to the instruction.

Next, a relationship between a supplying disconnection of the external power and the switching of the supplying source of the use power will be described.

Figure 12:
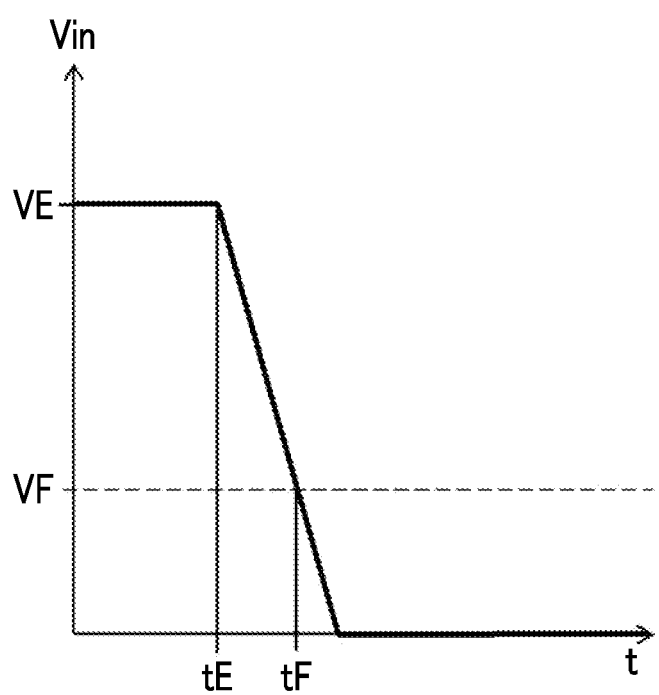
FIG. 12 is a diagram showing an example of a voltage drop in an apparatus in which there is no battery with the valid voltage and the supplying of the external power is disconnected in the related art.

In a case where there is a configuration in which there is no external power feed connection path L3 as in the related art and the power feed unit to which the external power supply is connected is preferentially selected, the power feed voltage Vin from the first power feed circuit 51 to the selection circuit 53 of the digital camera 50 instantaneously drops as shown in FIG. 12 in a case where the cable 70C of the AC adapter 70 is removed from the digital camera 50 in a state where there is no first battery 12 with the valid voltage in the digital camera 50. Therefore, the voltage for the power feed to each unit of the digital camera 50 also instantaneously drops.

Figure 8:
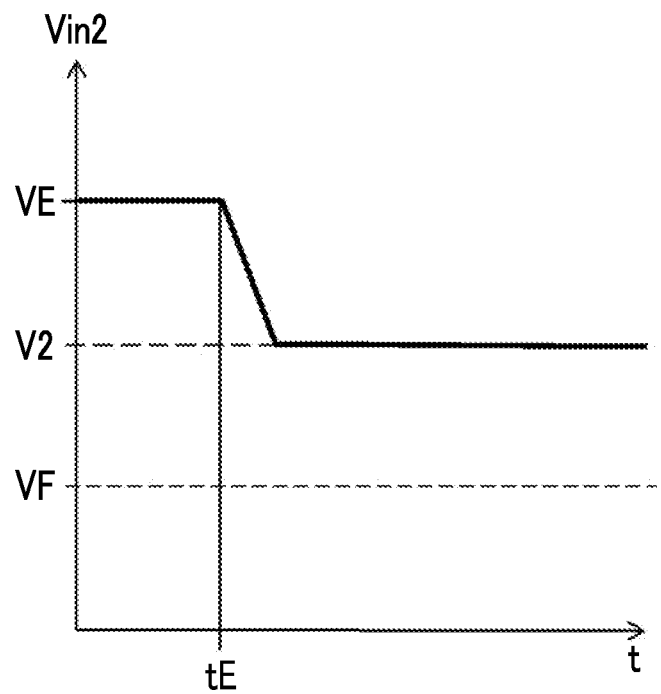
FIG. 8 is a diagram showing a change in an input voltage to the selection circuit in a case where supply of external power is disconnected in an apparatus having no battery with a valid voltage.

In this example, there is the configuration in which there is the external power feed connection path L3 and the power feed unit to which the battery with the valid voltage is connected (that is, power feed unit that receives internal power) is preferentially selected. Therefore, even in the case where the cable 70C of the AC adapter 70 is removed from the digital camera 50 in a state where there is no first battery 12 with the valid voltage in the digital camera 50, a power feed voltage Vin2 from the second power feed circuit 61 of the grip 60 to the selection circuit 53 is changed only from the voltage VE of the AC adapter 70 to a voltage V2 (valid voltage VF or more) of the second battery 22 as shown in FIG. 8 and a change in an output voltage of the selection circuit 53 is also the same since the second power feed circuit 61 of the grip 60 is selected in advance. In other words, in the case where there is the battery with the valid voltage, a voltage of the selection power output terminal T3 of the selection circuit 53 can be changed as shown in FIG. 8 and thus the digital camera 50 is not abnormally ended for sure. In FIG. 8, time tE is when the cable 70C is removed.

As described above, even in the case where the external power is disconnected from the external power supply (AC adapter 70 in this example) in the state where the voltage of the first battery 12 in the electronic apparatus (digital camera 50 in this example) is invalid, it is possible to supply the power from the second battery 22 to each unit of the electronic apparatus without switching a selection destination (supplying source of use power of electronic apparatus) since the second power feed unit (second power feed circuit 61 in this example) of the connection apparatus (grip 60 in this example) connected to the second battery 22 with the valid voltage is selected in advance. That is, it is possible to prevent the abnormal end of the electronic apparatus. Similarly, it is possible to surely prevent the abnormal end of the electronic apparatus also in a case where the external power is disconnected in a state where the battery voltage of the second battery 22 in the connection apparatus (grip 60 in this example) is invalid.

Figure 9:
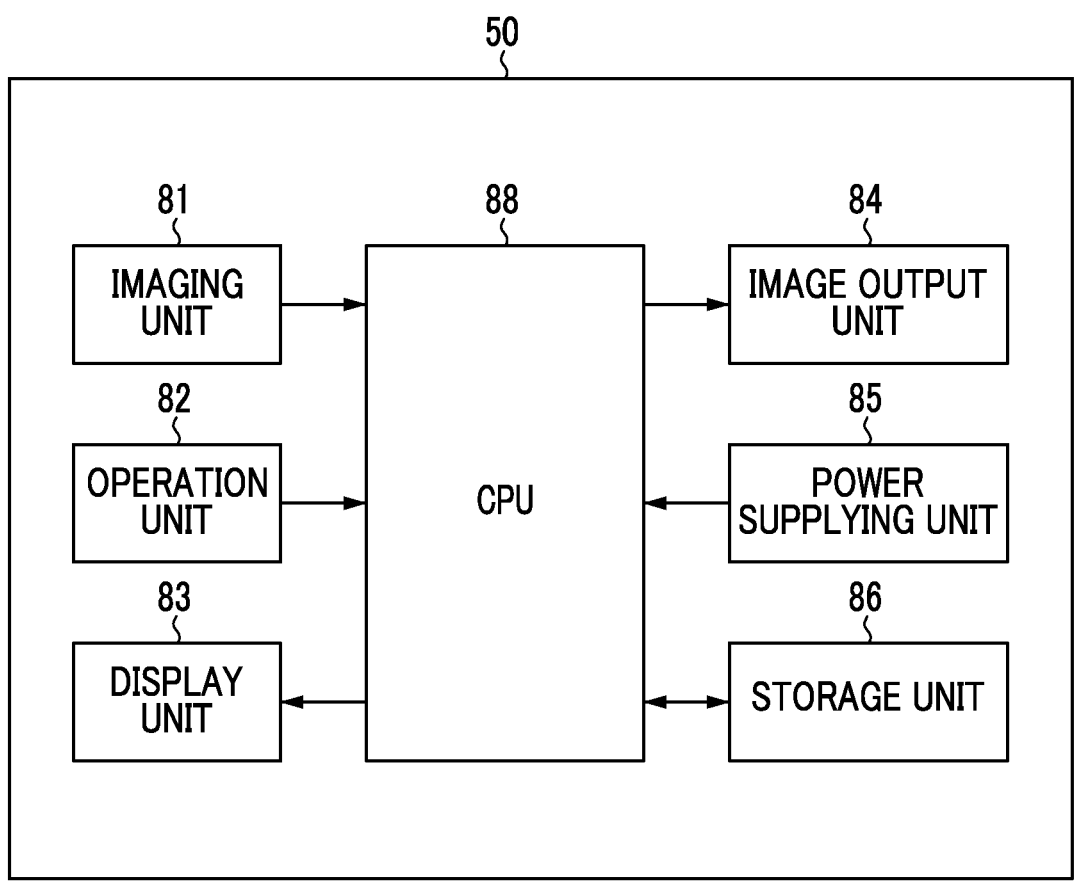
FIG. 9 is a block diagram showing an overall configuration example of a digital camera.

FIG. 6 shows the elements relating to a power supplying function of the digital camera 50, but the digital camera 50 comprises elements having functions other than the power supplying function as exemplified in FIG. 9 (block diagram showing overall configuration example of digital camera 50).

The digital camera 50 shown in FIG. 9 comprises an imaging unit 81 that images an object, an operation unit 82 that receives the instruction input by a user, a display unit 83 that displays various types of pieces of information including an image to the user, an image output unit 84 that outputs the image to the outside, a power supplying unit 85 that supplies the power to each necessary unit of the digital camera 50, a storage unit 86 having a transitory storage device and a non-transitory storage device, and a central processing unit (CPU) 88 that controls each unit of the digital camera 50 according to a program stored in the non-transitory storage device of the storage unit 86. The power supplying unit 85 of this example is configured by including the first power feed circuit 51, the selection circuit 53, the power supply OR circuit 58, and the reverse current prevention circuit 59 shown in FIG. 6. The main body controller 55 of FIG. 6 may be included in the power supplying unit 85 or may be configured of the CPU 88.

<Variations of External Power>

Variations of the external power will be described.

FIG. 6 shows the example that the external power from the AC adapter 70 outside the apparatus is supplied, but the invention is not limited to such a case. The invention can be employed in a case where various types of external power are used.

First, the invention is not limited to the case where the AC adapter is provided outside the apparatus and can be also employed in a case where the AC adapter is provided in the apparatus. In this case, the AC power supply (alternating current power supply) corresponds to the external power supply. At least one of the first power feed unit in the apparatus or the second power feed unit in the connection apparatus may be connected to the AC power supply outside the apparatus through the AC adapter in the apparatus.

Second, the invention is not limited to the case where the apparatus is wiredly connected to the external power supply and can be employed also in a case where the apparatus is wirelessly connected to the external power supply. In this case, the external power may be supplied to the power feed units (first power feed unit and second power feed unit) in the apparatus by power transmission using the magnetic field or the electric field.

Third, the invention is not limited to the case where the external power supply is non-battery power supply and can be employed in a case where the external power supply is referred to as so-called "battery". In this case, "first battery" and "second battery" are the batteries in the apparatus (built-in batteries), and "external power supply" is the battery outside the apparatus. For example, in a case where the apparatus can be mounted on a vehicle, an on-vehicle battery outside the apparatus may be used as the external power supply. For example, in a case where the apparatus is used indoors, an outdoor solar cell may be used as the external power supply.

<Variation of Apparatus>

Variations of the electronic apparatus and the connection apparatus will be described.

FIG. 1 shows the case where the electronic apparatus 10 and the connection apparatus 20 are respectively provided with the external power input terminal (first external power input terminal T1 or second external power input terminal T2) capable of receiving the external power from the external power supply 30, but the invention is not limited to such a case. The invention may be a case where one of the electronic apparatus 10 and the connection apparatus 20 is provided with the external power input terminal capable of receiving the external power from the external power supply.

Figure 10:
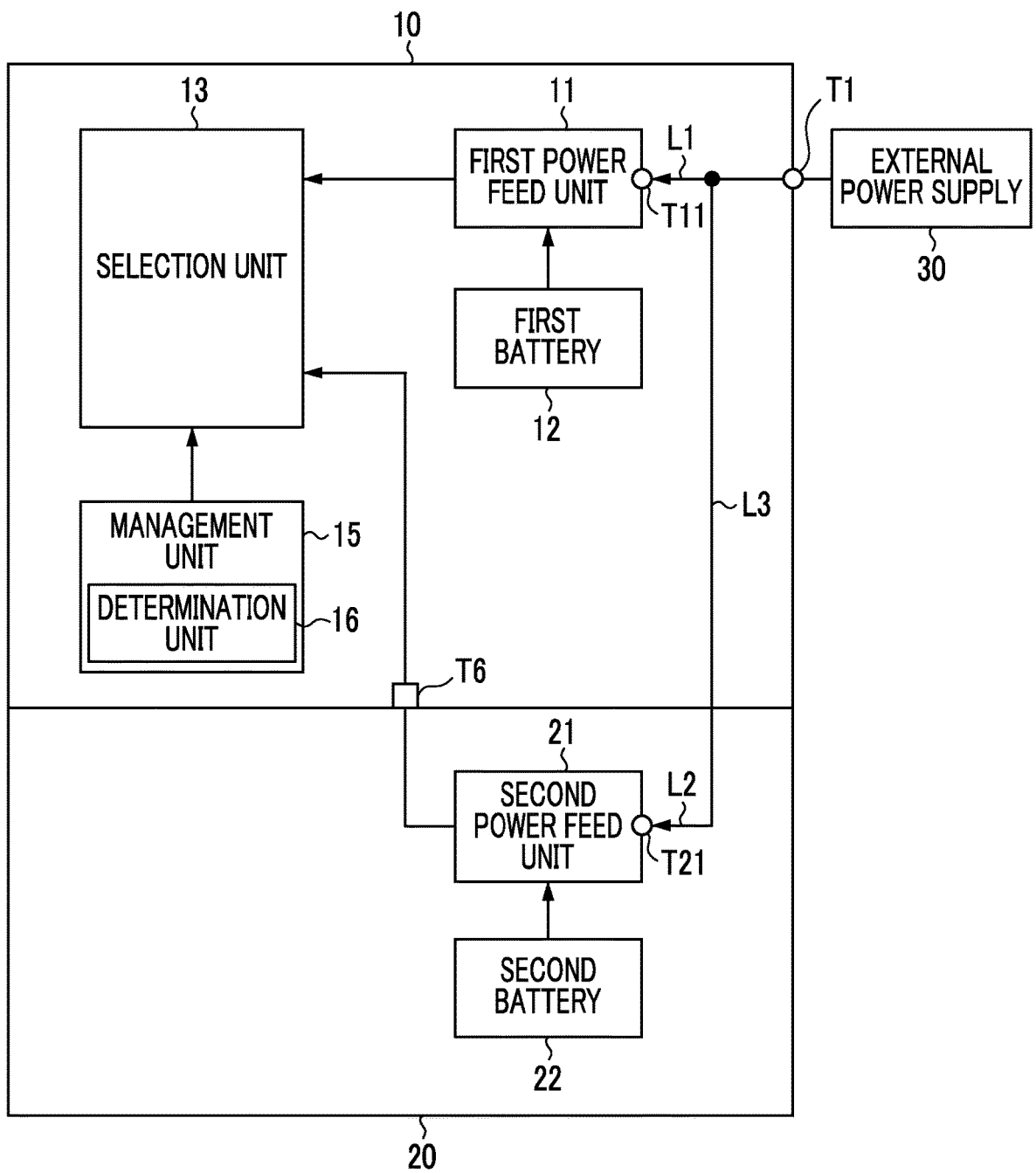
FIG. 10 is a block diagram showing a case where an external power input terminal is provided only in the electronic apparatus.

FIG. 10 shows a case where only the electronic apparatus 10 of the electronic apparatus 10 and the connection apparatus 20 is provided with the external power input terminal T1. In FIG. 10, the first power feed unit 11 of the electronic apparatus 10 is connected to the external power input terminal T1, not through the external power feed connection path L3, and the second power feed unit 21 of the connection apparatus 20 is connected to the external power input terminal T1 through the external power feed connection path L3.

Figure 11:
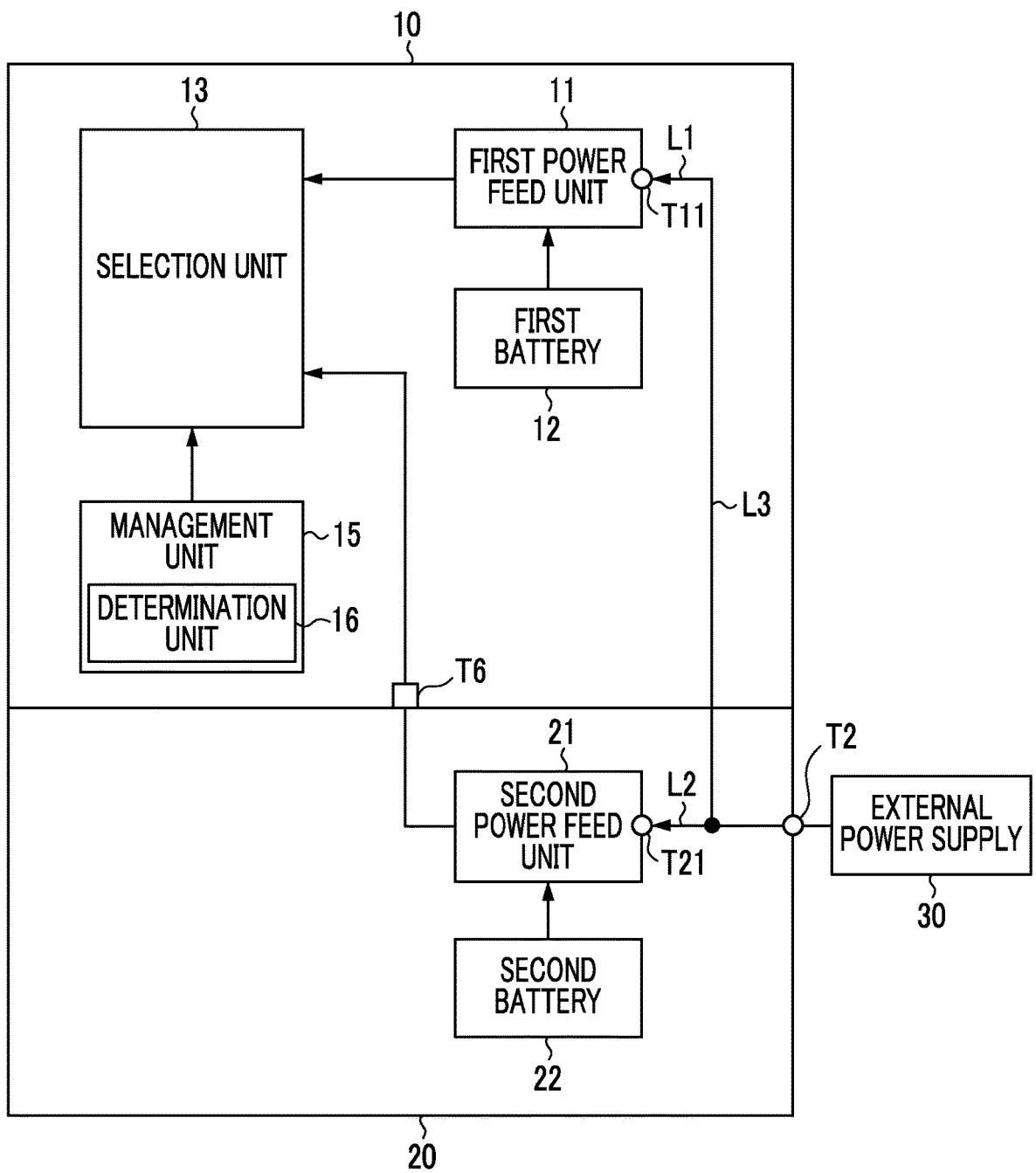
FIG. 11 is a block diagram showing a case where the external power input terminal is provided only in the connection apparatus.

FIG. 11 shows a case where only the connection apparatus 20 of the electronic apparatus 10 and the connection apparatus 20 is provided with the external power input terminal T2. In FIG. 11, the first power feed unit 11 of the electronic apparatus 10 is connected to the external power input terminal T2 through the external power feed connection path L3, and the second power feed unit 21 of the connection apparatus 20 is connected to the external power input terminal T2 not through the external power feed connection path L3.

Further, FIGS. 1 and 6 show the case where the connection apparatus 20 (for example, grip 60) is attachable to the electronic apparatus 10 (for example, digital camera 50), but the invention is not limited to such a case. The invention can be employed in the case where the electronic apparatus and the connection apparatus are wiredly connected by the cable and also in the case where the electronic apparatus and the connection apparatus are wirelessly connected.

Further, the digital camera 50 (camera main body) and the grip 60 (external apparatus) are introduced as a combination of the electronic apparatus 10 and the connection apparatus 20 in FIG. 6, but the invention is not limited to such a case. The invention can be employed in various combinations of a plurality of apparatuses.

The forms for implementing the invention have been described. However, the invention is not limited to the embodiments and the modification examples described above, and various modifications are possible without departing from the gist of the invention.

EXPLANATION OF REFERENCES

10: electronic apparatus
11: first power feed unit
12: first battery

13: selection unit
15: control unit
16: determination unit
20: connection apparatus
21: second power feed unit
22: second battery
30: external power supply
50: digital camera
51: first power feed circuit
53: selection circuit
54: conductive gate
55: main body controller
58: power supply OR circuit
59: reverse current prevention circuit
60: grip
61: second power feed circuit
63A, 63B, 64: conductive gate
65: grip controller
67: second battery detection circuit
69: reverse current prevention circuit
70: AC adapter
70C: cable
81: imaging unit
82: operation unit
83: display unit
84: image output unit
85: power supplying unit
86: storage unit
88: CPU
531, 532: switch element
571: first battery detection circuit
572: power feed detection circuit
533: switching IC
L1: first external power feed path
L2: second external power feed path
L3: external power feed connection path
T1: first external power input terminal
T2: second external power input terminal
T11: external power input terminal of first power feed unit
T21: external power input terminal of second power feed unit
T3: selection power output terminal
T31: first selection power input terminal
T32: second selection power input terminal
T33: instruction input terminal
T6, T6A, T6B: connection apparatus power input terminal
T6C: external power feed connection terminal

What is claimed is:

1. An electronic apparatus to which a connection apparatus is connectable, the electronic apparatus comprising:
a first power feed unit that is provided in the electronic apparatus, is capable of receiving internal power from a first battery in the electronic apparatus and of receiving external power, and preferentially outputs the external power rather than the internal power from the first battery;
an external power feed connection unit that connects a power feed path of the external power to the first power feed unit and a power feed path of the external power to a second power feed unit that is provided in the connection apparatus and that feeds power from the connection apparatus to the electronic apparatus;
a selection unit that selects one of the first power feed unit and the second power feed unit as a supplying source of use power of the electronic apparatus; and
a control unit that causes the selection unit to select a power feed unit that receives the internal power with a valid voltage between the first power feed unit and the second power feed unit,
wherein in a state where one apparatus that receives the external power between the electronic apparatus and the connection apparatus does not have a battery with a valid voltage and the other apparatus has a battery with a valid voltage,
in a case where the external power to the one apparatus is disconnected,
the external power is supplied from the other apparatus to the power feed unit of the one apparatus via the external power feed connection unit, and the selection unit selects the selected power feed unit of the other apparatus,
thereby a supplying source of power is switched from the disconnected external power to the battery of the other apparatus.

2. The electronic apparatus according to claim 1,
wherein the first power feed unit preferentially outputs power with a higher voltage between the internal power from the first battery and the external power to the selection unit.

3. The electronic apparatus according to claim 1,
wherein the control unit has a determination unit that determines presence or absence of the first battery with a valid voltage and provides an instruction of the selection to the selection unit based on a result of the determination by the determination unit.

4. The electronic apparatus according to claim 3,
wherein in a state where the first battery has the valid voltage, the control unit causes the selection unit to select a power feed unit set in advance between the first power feed unit and the second power feed unit.

5. The electronic apparatus according to claim 1,
wherein the electronic apparatus is provided with an external power input terminal capable of receiving the external power from an external power supply,
wherein the first power feed unit is connected to the external power input terminal provided in the electronic apparatus.

6. The electronic apparatus according to claim 5, further comprising:
a reverse current prevention circuit that prevents a current from flowing to the external power supply connected to the external power input terminal of the electronic apparatus.

7. The electronic apparatus according to claim 1, further comprising:
a power supply OR circuit that receives the output of the first power feed unit and the output of the second power feed unit, and supplies the power to the control unit.

8. A camera as one form of the electronic apparatus according to claim 1, wherein the connection apparatus is a battery grip.

9. An electronic apparatus to which a connection apparatus is connectable, the electronic apparatus comprising:
a first power feed unit that is capable of receiving internal power from a first battery in the electronic apparatus and of receiving external power, and preferentially outputs the external power rather than the internal power from the first battery;
a connection apparatus power input terminal connected to a second power feed unit that is provided in the connection apparatus, is capable of receiving internal power from a second battery in the connection apparatus and of receiving the external power, and preferentially outputs the external power rather than the internal power from the second battery;

an external power feed connection unit that connects a power feed path of the external power to the first power feed unit and a power feed path of the external power to the second power feed unit;

a selection unit that selects one of the first power feed unit and the second power feed unit as a supplying source of use power of the electronic apparatus; and a control unit that causes the selection unit to select a power feed unit that receives the internal power with a valid voltage between the first power feed unit and the second power feed unit, wherein in a state where one apparatus that receives the external power between the electronic apparatus and the connection apparatus does not have a first battery or a second battery with a valid voltage and the other apparatus has the second battery or the first battery with a valid voltage, in a case where the external power to the one apparatus is disconnected, the external power is supplied from the other apparatus to the power feed unit of the one apparatus via the external power feed connection unit, and the selection unit selects the selected power feed unit of the other apparatus, thereby a supplying source of power is switched from the disconnected external power to the first battery or the second battery of the other apparatus.

10. The electronic apparatus according to claim 9, wherein the first power feed unit preferentially outputs power with a higher voltage between the internal power from the first battery and the external power to the selection unit, and wherein the second power feed unit preferentially outputs power with a higher voltage between the internal power of the second battery and the external power to the selection unit.

11. The electronic apparatus according to claim 9, wherein the control unit has a determination unit that determines presence or absence of the first battery and the second battery with a valid voltage and provides an instruction of the selection to the selection unit based on a result of the determination by the determination unit.

12. The electronic apparatus according to claim 11, wherein the control unit causes the selection unit to select a power feed unit set in advance between the first power feed unit and the second power feed unit in a state where both the first battery and the second battery have the valid voltage.

13. The electronic apparatus according to claim 11, wherein the control unit causes the selection unit to select the power feed unit connected to the battery with the valid voltage between the first power feed unit and the second power feed unit in a state where one of the first battery and the second battery has the valid voltage.

14. The electronic apparatus according to claim 9, wherein the electronic apparatus and the connection apparatus are respectively provided with an external power input terminal capable of receiving the external power from an external power supply, wherein the first power feed unit is connected to the external power input terminal provided in the electronic apparatus, and wherein the second power feed unit is connected to the external power input terminal provided in the connection apparatus.

15. The electronic apparatus according to claim 14, further comprising:

a reverse current prevention circuit that prevents a current from flowing from one external power supply to the other external power supply of the external power supply connected to the external power input terminal of the electronic apparatus and the external power supply connected to the external power input terminal of the connection apparatus.

16. The electronic apparatus according to claim 9, wherein one of the electronic apparatus and the connection apparatus is provided with an external power input terminal capable of receiving the external power from an external power supply, and wherein one of the first power feed unit and the second power feed unit is connected to the external power input terminal through the external power feed connection unit, and the other power feed unit is connected to the external power input terminal, not through the external power feed connection unit.

17. The electronic apparatus according to claim 9, further comprising:

a power supply OR circuit that receives the output of the first power feed unit and the output of the second power feed unit, and supplies the power to the control unit.

18. A power supplying system including an electronic apparatus and a connection apparatus connectable to the electronic apparatus, the power supplying system comprising:

a first power feed unit that is provided in the electronic apparatus, is capable of receiving internal power from a first battery in the electronic apparatus and of receiving external power, and preferentially outputs the external power rather than the internal power from the first battery;

a second power feed unit that is provided in the connection apparatus, is capable of receiving internal power from a second battery in the connection apparatus and of receiving the external power, and preferentially outputs the external power rather than the internal power from the second battery;

an external power feed connection unit that connects a power feed path of the external power to the first power feed unit and a power feed path of the external power to the second power feed unit;

a selection unit that selects one of the first power feed unit and the second power feed unit as a supplying source of use power of the electronic apparatus; and a control unit that causes the selection unit to select a power feed unit that receives the internal power with a valid voltage between the first power feed unit and the second power feed unit, wherein in a state where one apparatus that receives the external power between the electronic apparatus and the connection apparatus does not have a first battery or a second battery with a valid voltage and the other apparatus has the second battery or the first battery with a valid voltage, in a case where the external power to the one apparatus is disconnected, the external power is supplied from the other apparatus to the power feed unit of the one apparatus via the external power feed connection unit, and the selection unit selects the selected power feed unit of the other apparatus, thereby a supplying source of power is switched from the disconnected external power to the first battery or the second battery of the other apparatus.

19. The power supplying system according to claim 18, wherein the first power feed unit preferentially outputs power with a higher voltage between the internal power from the first battery and the external power to the selection unit, and wherein the second power feed unit preferentially outputs power with a higher voltage between the internal power of the second battery and the external power to the selection unit.

20. The power supplying system according to claim 19, wherein the control unit has a determination unit that determines presence or absence of the first battery and the second battery with a valid voltage and provides an instruction of the selection to the selection unit based on a result of the determination by the determination unit.

21. The power supplying system according to claim 20, wherein the control unit causes the selection unit to select a power feed unit set in advance between the first power feed unit and the second power feed unit in a state where both the first battery and the second battery have the valid voltage.

22. The power supplying system according to claim 20, wherein the control unit causes the selection unit to select a power feed unit connected to the battery with the valid voltage between the first power feed unit and the second power feed unit in a state where one of the first battery and the second battery has the valid voltage.

23. The power supplying system according to claim 18, wherein the electronic apparatus and the connection apparatus are respectively provided with an external power input terminal capable of receiving the external power from an external power supply, wherein the first power feed unit is connected to the external power input terminal provided in the electronic apparatus, and wherein the second power feed unit is connected to the external power input terminal provided in the connection apparatus.

24. The power supplying system according to claim 23, further comprising:

a reverse current prevention circuit that prevents a current from flowing from one external power supply to the other external power supply of the external power supply connected to the external power input terminal of the electronic apparatus and the external power supply connected to the external power input terminal of the connection apparatus.

25. The power supplying system according to claim 18, wherein one of the electronic apparatus and the connection apparatus is provided with an external power input terminal capable of receiving the external power from an external power supply, and wherein one of the first power feed unit and the second power feed unit is connected to the external power input terminal through the external power feed connection unit and the other power feed unit is connected to the external power input terminal, not through the external power feed connection unit.

26. The power supplying system according to claim 18, further comprising:

a power supply OR circuit that receives the output of the first power feed unit and the output of the second power feed unit, and supplies the power to the control unit.

27. A power supplying method supplying power to an electronic apparatus using a first power feed unit that is provided in the electronic apparatus, is capable of receiving internal power from a first battery in the electronic apparatus and of receiving external power, and preferentially outputs the external power rather than the internal power from the first battery, and a second power feed unit that is provided in a connection apparatus connectable to the electronic apparatus, is capable of receiving internal power from a second battery in the connection apparatus and of receiving the external power, and preferentially outputs the external power rather than the internal power from the second battery, the method comprising:

connecting a power feed path of the external power to the first power feed unit and a power feed path of the external power to the second power feed unit; and selecting a power feed unit that receives the internal power with a valid voltage between the first power feed unit and the second power feed unit as a supplying source of use power of the electronic apparatus, wherein in a state where one apparatus that receives the external power between the electronic apparatus and the connection apparatus does not have a first battery or a second battery with a valid voltage and the other apparatus has the second battery or the first battery with a valid voltage, in a case where the external power to the one apparatus is disconnected, the external power is supplied from the other apparatus to the power feed unit of the one apparatus via the external power feed connection unit, and the selection unit selects the selected power feed unit of the other apparatus, thereby a supplying source of power is switched from the disconnected external power to the first battery or the second battery of the other apparatus.

* * * * *